United States Patent
Takashima et al.

(10) Patent No.: US 8,885,863 B2
(45) Date of Patent: Nov. 11, 2014

(54) LOUDSPEAKER DEVICE

(75) Inventors: Yuji Takashima, Ikoma (JP); Hiroyuki Naono, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 0 days.

(21) Appl. No.: 13/321,096

(22) PCT Filed: May 17, 2010

(86) PCT No.: PCT/JP2010/003301
§ 371 (c)(1),
(2), (4) Date: Nov. 17, 2011

(87) PCT Pub. No.: WO2010/134312
PCT Pub. Date: Nov. 25, 2010

(65) Prior Publication Data
US 2012/0063627 A1    Mar. 15, 2012

(30) Foreign Application Priority Data

| May 19, 2009 | (JP) | 2009-120816 |
| Jul. 9, 2009 | (JP) | 2009-163011 |
| Jul. 9, 2009 | (JP) | 2009-163012 |
| Jul. 9, 2009 | (JP) | 2009-163013 |

(51) Int. Cl.
*H04R 1/20*    (2006.01)
(Continued)

(52) U.S. Cl.
CPC ........ *H04R 1/2803* (2013.01); *B01D 2253/311* (2013.01); *D01D 5/247* (2013.01);
(Continued)

(58) Field of Classification Search
CPC .. H04R 2201/029; H04R 1/28; H04R 1/2803; H04R 1/2807

USPC .......... 381/345, 354, 349; 181/148, 151, 198, 181/149, 175
See application file for complete search history.

(56) References Cited

U.S. PATENT DOCUMENTS 4,657,108 A * 4/1987 Ward ............................. 181/151
7,448,467 B2 * 11/2008 Wright et al. ................. 181/149
(Continued)

FOREIGN PATENT DOCUMENTS

| JP | 2007-229707 A | 9/2007 |
| JP | 2009-27527 A | 2/2009 |

(Continued)

OTHER PUBLICATIONS

Bansal, Roop Chand; "Activated Carbon Adsorption"; 2005; CRC Press; p. iii.*

(Continued)

*Primary Examiner* — Curtis Kuntz
*Assistant Examiner* — Ryan Robinson
(74) *Attorney, Agent, or Firm* — Crowell & Moring LLP

(57) ABSTRACT

An object of the present invention is to provide a loudspeaker device which has a high moisture resistance and can further widens an audio range of low-frequency range sounds. To achieve the above object, a closed box loudspeaker device of the present invention includes a loudspeaker unit which is attached to an opening in a box and activated carbon fiber which is provided in the box to adsorb gas. The activated carbon fiber has plural pores, which are exposed on a surface of the activated carbon fiber and have a diameter of 2.0 nm or less, and a volume of the pores having the diameter of 2.0 nm or less occupies 60% or more of a volume of the entire pores, so that the loudspeaker device which simultaneously achieves both an enhancement of the moisture resistance and the widening of the audio range of the low-frequency range sounds can be provided.

17 Claims, 3 Drawing Sheets

(51) Int. Cl.
  *D01D 5/247* (2006.01)
  *B01D 53/28* (2006.01)
  *C01B 31/08* (2006.01)
  *D01F 9/24* (2006.01)
  *B82Y 30/00* (2011.01)
  *D01F 9/145* (2006.01)
  *C01B 31/02* (2006.01)
  *B82Y 40/00* (2011.01)
  *H04R 1/28* (2006.01)
  *B01D 53/26* (2006.01)

(52) U.S. Cl.
  CPC ........ *H04R 2499/15* (2013.01); *H04R 2499/13* (2013.01); *B01D 53/28* (2013.01); *C01B 31/083* (2013.01); *H04R 1/2819* (2013.01); *C01B 31/08* (2013.01); *B01D 2253/102* (2013.01); *D01F 9/24* (2013.01); *B01D 2257/80* (2013.01); *B82Y 30/00* (2013.01); *D01F 9/145* (2013.01); *C01B 31/022* (2013.01); *B82Y 40/00* (2013.01); *B01D 53/261* (2013.01); *B01D 2253/308* (2013.01)
  USPC ........... 381/354; 381/345; 381/349; 181/151; 181/148; 181/149; 181/175

(56) References Cited

U.S. PATENT DOCUMENTS

| | | | |
|---|---|---|---|
| 7,991,181 B2 * | 8/2011 | Saiki et al. | 381/386 |
| 8,265,330 B2 * | 9/2012 | Fukunishi et al. | 381/386 |
| 8,335,333 B2 * | 12/2012 | Saiki et al. | 381/345 |
| 2007/0195982 A1 | 8/2007 | Saiki et al. | |
| 2009/0120715 A1 * | 5/2009 | Saiki | 181/151 |
| 2010/0074463 A1 | 3/2010 | Fukunishi et al. | |
| 2012/0027243 A1 * | 2/2012 | Imamura et al. | 381/389 |

FOREIGN PATENT DOCUMENTS

| | | |
|---|---|---|
| WO | WO 2006/035564 A1 | 4/2006 |
| WO | WO 2009/014015 A1 | 1/2009 |

OTHER PUBLICATIONS

Unitika Advanced Materials Division, "Unitika Activated Carbon Fiber—Adall", Unitika Kasseitan Sen'l Adall, [online], Oct. 3, 2002, [retrieval date Jun. 1, 2010, Internet <URL:http://web.archive.org/web/20021003102103/http://www.unitika.co.jp/shinki/A_CarbonFibers/home.htm>, including English-language translation (Two (2) pages).
International Search Report dated Jun. 22, 2010 including English-language translation (Three (3) pages).

* cited by examiner

| SAMPLE | BEFORE MOISTURE ADSORPTION EXPERIMENT | AFTER MOISTURE ADSORPTION EXPERIMENT |
|---|---|---|
| A | 233~234Hz | 239~240Hz |
| B | 236~237Hz | 239~240Hz |
| C | 243~244Hz | 243~244Hz |
| D | 238~239Hz | 238~239Hz |

LOUDSPEAKER DEVICE

TECHNICAL FIELD

The present invention relates to a loudspeaker device provided with a box and a loudspeaker unit, and more particularly, it relates to a loudspeaker device which includes activated carbon fiber in the box to adsorb gas in response to a pressure change of acoustic waves which are radiated from a back surface of the loudspeaker unit.

BACKGROUND ART

In loudspeaker device provided with a box and a loudspeaker unit which is attached to an inner wall surface of the box, a reduction of box volume leads to a worsening of an audio performance of low-frequency range sounds, since an acoustic stiffness of the loudspeaker device increases.

Conventionally, as a method to solve the above problem, there are various suggestions of loudspeaker devices in which granular or fibrous activated carbon generated from palm shell, wood, coal pitch, petroleum pitch, phenol resin, or the like is placed inside the box so that the acoustic stiffness is reduced by a physical gas adsorption action of the activated carbon and an audio range of the low-frequency range sounds is widened.

For example, a closed box loudspeaker device in which activated carbon fiber in form of cloth (a micropore diameter: $\Phi 1.0$ nm to 2.5 nm, a specific surface area: 500 m$^2$/g or more) generated from the phenol resin is placed inside a box is suggested. In the activated carbon fiber, nano-order pores, which is referred to as micropores, are exposed on a surface of the fiber, and moreover, there is no macropore to form a high cut filter, so that a physical gas adsorption effect is also effective in high frequency range sounds of 100 to 200 Hz or more. Accordingly, the closed box loudspeaker device which has the effect of widening the audio range of the low-frequency range sounds can also be achieved with a small-sized box which has the audio range of the low-frequency range sounds, whose frequency band is relatively high.

However, when the above activated carbon fiber adsorbs moisture, its gas adsorption performance is deteriorated, so that the activated carbon fiber could not be applied to a loudspeaker device such as a bass reflex loudspeaker device in which outside air flows into the box.

Thus, there is a suggestion of a loudspeaker device in which activated carbon fiber wrapped in a shielding member, which is made of a plastic film such as polyvinyl chloride, vinylidene chloride, or the like, is placed in a box to prevent the deterioration of the activated carbon fiber by the moisture (refer to patent document 1, for example).

Moreover, a loudspeaker system in which activated carbon (granular activated carbon made from coal), whose pore diameter is 3.6 to 10 nm and a total volume of the pores is 0.4 ml/g or more, is placed in a box is suggested as a loudspeaker system which improves a moisture resistance. Even when the activated carbon is left in an atmosphere having a temperature of 30 degrees Celsius and a relative humidity of 70% for 24 to 48 hours, its gas adsorption performance is not reduced, so that the activated carbon can be applied to a bass reflex loudspeaker system in which the outside air flows into a box (refer to patent document 2, for example).

PRIOR ART DOCUMENT(S)

Patent Document(s)

Patent Document 1: Domestic Re-publication of PCT International Publication for Patent Application WO 2006/035564

Patent Document 2: Japanese Laid-Open Patent Publication No. 2009-27527

SUMMARY OF THE INVENTION

Problems to be Solved by the Invention

However, when the activated carbon fiber is wrapped in the shielding member made of the plastic film or the like as disclosed in the patent document 1, a sound transmission loss occurs due to the shielding member, so that an acoustic transmissivity is reduced. Moreover, the shielding member acts as an acoustic impedance, so that it reduces the gas adsorption performance of the activated carbon fiber.

Moreover, an amount of water which is adsorbed by the activated carbon disclosed in the patent document 2 is 0.05 g or less per 1 g of the activated carbon at the relative humidity of 70% or less, so that the gas adsorption performance is not reduced. However, the amount of water is 0.7 g or more per 1 g of the activated carbon at the relative humidity of 85% or more, and adsorption sites of the gas are reduced, so that the gas adsorption performance is significantly reduced or lost.

As described above, the loudspeaker device which enables simultaneously the moisture resistance and the widening of the audio range of the low-frequency range sounds cannot be achieved the conventional activated carbon. Consequently, the present invention is to solve the above conventional problems, and an object of the present invention is to provide a loudspeaker device which can enhance the moisture resistance and widen the audio range of the low-frequency range sounds simultaneously.

Means to Solve the Problem(s)

To solve the above problem and achieve the above object, a loudspeaker device of the present invention includes: a box which has an opening; a loudspeaker unit which is attached to the opening in an inner side of the box; and activated carbon fiber in the box to adsorb gas in atmosphere in response to a pressure change of acoustic waves which are radiated from a back surface of the loudspeaker unit, wherein the activated carbon fiber has adsorption sites which adsorb the gas regardless of a degree of humidity in the atmosphere.

According to the above configuration, gas adsorption performance of the activated carbon fiber is retained even when outside air flows into the box, so that the loudspeaker device such as the bass reflex loudspeaker device in which the outside air flows into the box can be achieved.

Moreover, the activated carbon fiber has plural pores, which are exposed on a surface of the activated carbon fiber and have a diameter of 2.0 nm or less, and a volume of the pores having the diameter of 2.0 nm or less occupies 60% or more of a volume of the entire pores.

According to the above configuration, even when the activated carbon fiber is exposed to the atmosphere having a relative humidity of 95% or more, an amount of saturated adsorption of moisture adsorbed by the activated carbon fiber is reduced. Thus, the activated carbon fiber which has a number of adsorption sites, which adsorb the gas regardless of a degree of humidity, and a high moisture resistance can be achieved.

Moreover, the pores exposed on the surface of the activated carbon fiber have a diameter of 1.8 nm or less and a volume of the pores having the diameter of 1.8 nm or less occupies 80% or more of a volume of the entire pores.

According to the above configuration, a variation of a lowest resonance frequency with a moisture change is made smaller, so that the loudspeaker device with a stable acoustic property can be achieved.

Moreover, a material of the activated carbon fiber is coal pitch or phenol resin.

According to the above configuration, a pore size control and a pore size distribution can easily be adjusted, so that the activated carbon fiber which has the high moisture resistance can easily be manufactured.

Moreover, the activated carbon fiber generated by the coal pitch or the phenol resin is thermally processed at a temperature of 800 to 1100 degrees Celsius.

According to the above configuration, an oxygenated functional group is thermally decomposed and disappears, so that the activated carbon fiber which is resistant to dew condensation can be achieved.

Moreover, the loudspeaker device is a closed box speaker device. Since the activated carbon fiber has the high moisture resistance, the box does not need to be sealed completely for purpose of preventing water vapor from entering the box. Thus, the closed box loudspeaker device can easily be manufactured and a manufacturing cost can be reduced.

Furthermore, the loudspeaker device is a bass reflex loudspeaker device having an acoustic port. Since the activated carbon fiber has the high moisture resistance, the activated carbon fiber does not need to be sealed in a shielding member such as a plastic film as is conventionally done. Thus, the bass reflex loudspeaker device in which an amount of gas adsorption is not reduced by the shielding member and a widening of an audio range of low-frequency range sounds is enhanced can be achieved.

Effect of the Invention

According to the loudspeaker device of the present invention, the activated carbon fiber which has the adsorption sites which adsorb the gas regardless of the degree of humidity is used, so that the loudspeaker device which simultaneously achieves both the enhancement of the moisture resistance and the widening of the audio range of the low-frequency range sounds can be provided.

DESCRIPTION OF THE PREFERRED EMBODIMENT(S)

A preferred embodiment of the present invention is described with reference to FIGS. 1A to 4.

Figure 1A:
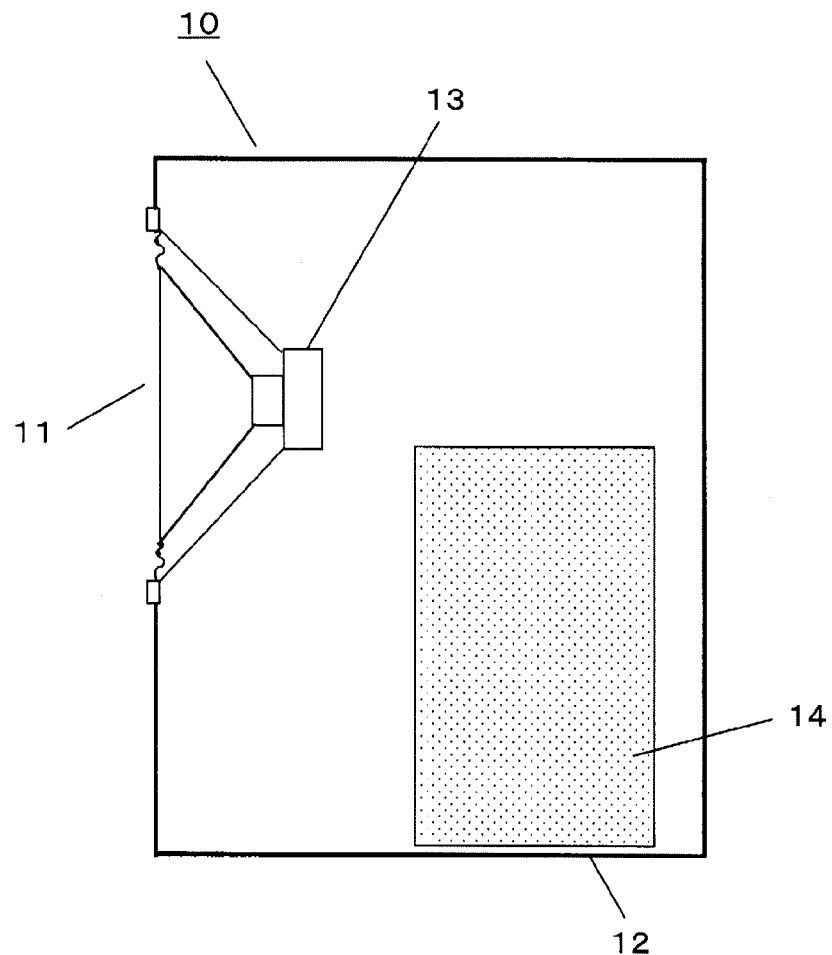
FIGS. 1A and 1B are schematic sectional views showing a configuration example of a closed box loudspeaker device according to the present invention.
Figure 1B:
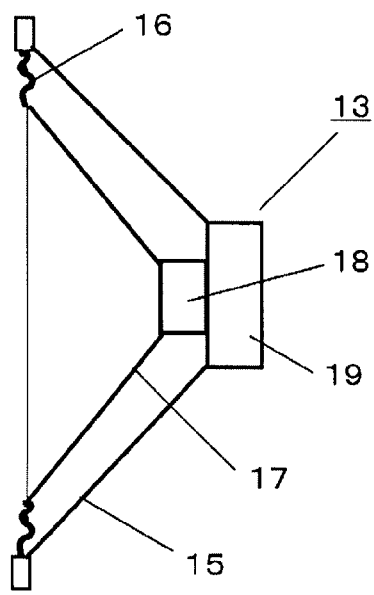

FIGS. 1A and 1B are schematic sectional views showing a configuration example of a closed box loudspeaker device according to the present invention.

Figures 2, 3:
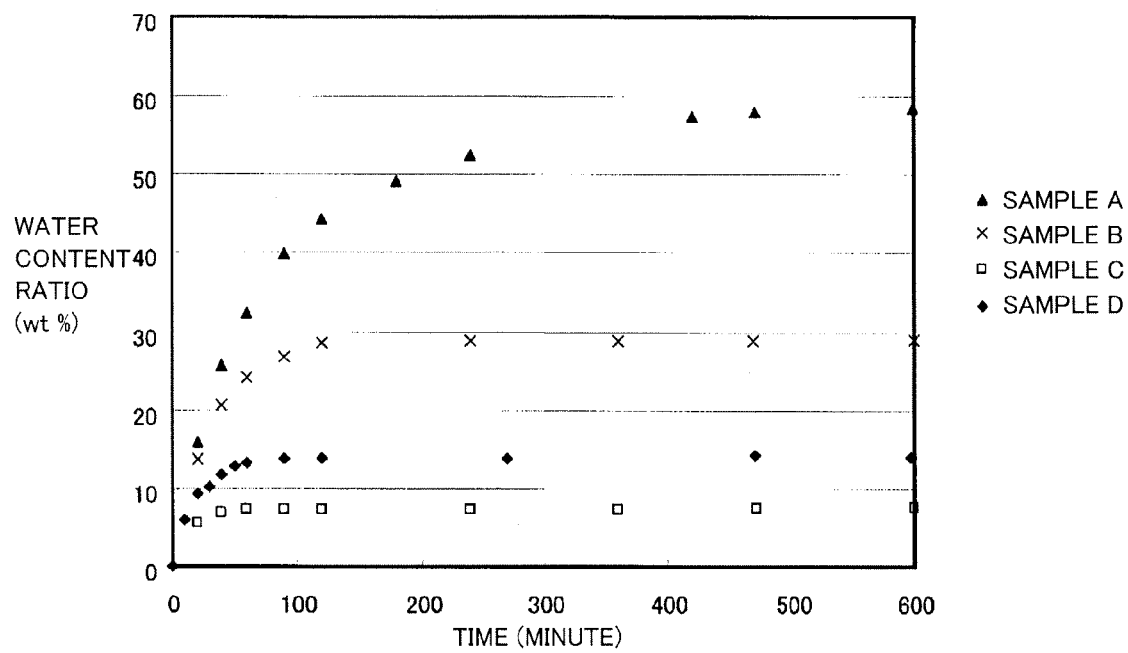
FIG. 2 is a graph showing a moisture absorption property of activated carbon fiber according to the present invention.
FIG. 3 is a table showing an acoustic property of the activated carbon fiber according to the present invention.
Figure 4:
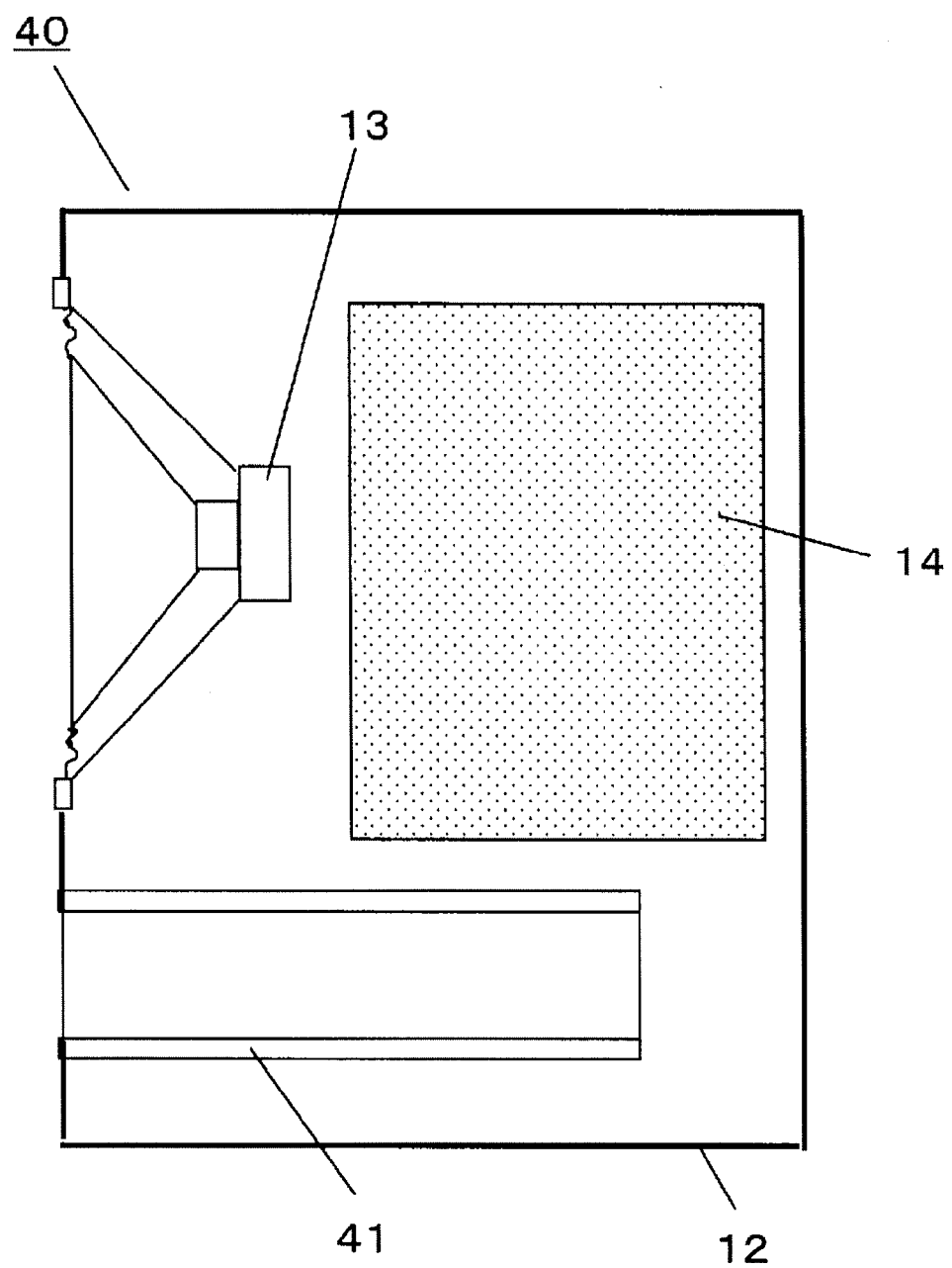
FIG. 4 is a schematic sectional view showing a configuration example of a bass reflex loudspeaker device according to the present invention.

FIG. 2 is a graph showing a moisture absorption property of activated carbon fiber according to the present invention. FIG. 3 is a table showing an acoustic property of the activated carbon fiber according to the present invention. FIG. 4 is a schematic sectional view showing a configuration example of a bass reflex loudspeaker device according to the present invention. In the above drawings, the same constituent elements are denoted by identical reference numerals, and a description of overlapping constituent elements is omitted.

(Preferred Embodiment 1)

The configuration example of the closed box loudspeaker device according to the present invention is described below. In the present preferred embodiment, a dynamic loudspeaker unit which is generally well known as a loudspeaker unit is used.

(Configuration of the Closed Box Loudspeaker Device)

As shown in FIG. 1A, a closed box loudspeaker device 10 includes a box 12 which has an opening 11, a dynamic loudspeaker unit 13 (abbreviated as the loudspeaker unit hereinafter) which is attached to the opening 11 in an inner side of the box 12, and an activated carbon fiber 14 placed inside the box 12. The activated carbon fiber 14 is made up of a material which has a pore structure to adsorb the gas in response to a pressure change of acoustic waves which are radiated from a back surface of the loudspeaker unit 13.

The activated carbon fiber 14 may be covered with a transaudient breathable member such as a nonwoven fabric, for example, (not shown in the drawings) in accordance with a form of the activated carbon fiber 14.

As shown in FIG. 1B, the loudspeaker unit 13 includes a cone-shaped diaphragm 17 (abbreviated as the diaphragm hereinafter) which radiates the acoustic waves, an edge 16 which supports the diaphragm 17, a voice coil 18 which transmits vibrations to the diaphragm 17, a magnet 19 which drives the voice coil 18 by action of a magnetic field, a frame 15 which supports the respective configuration members, and so on.

The closed box loudspeaker device 10 of the present preferred embodiment may have a configuration to make water vapor enter the box 12 from the diaphragm 17, the edge 16, or the like. Next, the configuration of the activated carbon fiber 14 is described in detail below.

(Configuration of the Activated Carbon Fiber)

As the activated carbon fiber 14 which can be applied to the present invention, any activated carbon fiber can be applied as long as it has adsorption sites which adsorb the gas regardless of a degree of humidity in atmosphere. It is preferable that the above activated carbon fiber has plural pores, which are exposed on a surface of the activated carbon fiber and have a diameter of 2.0 nm or less and a volume of the pores having the diameter of 2.0 nm or less occupies 60% or more of a volume of the entire pores. In this case, the volume of the entire pores is preferably 0.5 ml/g or less.

The activated carbon fiber having the above pore structure is preferable by reason that 500 $m^2$/g or more of a specific surface area of the pores having the adsorption sites, which adsorb the gas even when a water content ratio reaches saturation, can be obtained.

It is more preferable that the pores which are exposed on the surface of the activated carbon fiber have a diameter of 1.8 nm or less and a volume of the pores having the diameter of 1.8 nm or less occupies 80% or more of a volume of the entire pores. In this case, the volume of the entire pores is preferably 0.3 ml/g or less.

The activated carbon fiber having the above pore structure has an advantage that a variation of a lowest resonance frequency with a moisture change is smaller.

The above activated carbon fiber has less volume of the pores in which a water cluster is formed. Thus, a volume ratio of the pores having the adsorption sites, which adsorb the gas even when the water content ratio reaches saturation, is increased, so that the activated carbon fiber which has the high moisture resistance can be achieved.

As a material of the activated carbon fiber 14, carbide, which is made by carbonizing a material such as rayon fiber, acrylic fiber, phenolic fiber such as novoloid fiber or the like, coal pitch, petroleum pitch, or the like and then activated by steam, can be used. Among the above materials, the activated carbon fiber generated by the coal pitch or the phenol resin is preferable by reason that a pore size control and a pore size distribution can easily be adjusted and thus the activated carbon fiber which has the high moisture resistance can easily be manufactured.

In particular, the activated carbon fiber, which is generated by the coal pitch or the phenol resin and is then thermally processed at a temperature of 800 to 1100 degrees Celsius, is preferable by reason that an oxygenated functional group is thermally decomposed and disappears and thus an adsorption of moisture is further prevented.

As the form of the activated carbon fiber 14, activated carbon fiber in form of a cotton (a fiber mass), a thread of spun fiber, a felt, or a cloth is applicable and can be used arbitrarily and selectively in accordance with a purpose. Among the above activated carbon fibers, the cottony or the felty activated carbon fiber is preferable by reason that it has a high breathability, that is to say, a high acoustic transmissivity and also has a high gas adsorption efficiency since an area contacted by gas is widened. Next, the pore structure of the activated carbon fiber is described in detail below.

(Moisture Adsorption Experiment)

An experiment on a relationship between the pore structure of the activated carbon fiber and an amount of water which is adsorbed by the activated carbon fiber is performed. As a method of the experiment, an experiment device in which a netting is placed 1 to 2 cm above a surface of water in a container is provided, a sample activated carbon fiber is placed on the net, and then the container is covered with a lid and the water in the container is heated to a boil. That is to say, the sample is exposed to an atmosphere having a temperature of 95 to 100 degrees Celsius and a relative humidity of 95 to 100%, and an amount of saturated adsorption of moisture adsorbed by the sample is examined.

The activated carbon fibers used in the experiment are cottony coal pitch activated carbon fibers (samples A, B, and D) and a felty phenolic activated carbon fiber (a sample C) generated by the novoloid fiber as described below. Each sample is used for the experiment after being left in an atmosphere having a temperature of 20 degrees Celsius and a relative humidity of 30% for 24 hours. Moreover, a weight of each sample is 10 g.

Sample A . . . an average pore diameter: 2.2 nm, a volume of the entire pores: 0.8 ml/g, a specific surface area: 1500 m$^2$/g Sample B . . . an average pore diameter: 2.0 nm, a volume of the entire pores: 0.5 ml/g, specific surface area: 1000 m$^2$/g Sample C . . . an average pore diameter: 1.8 nm, a volume of the entire pores: 0.22 ml/g, specific surface area: 800 m$^2$/g Sample D . . . an average pore diameter: 1.7 nm, a volume of the entire pores: 0.3 ml/g, specific surface area: 700 m$^2$/g In the above case, a property value of the pores indicates a value obtained from a measurement by BET method using nitrogen gas.

An experimental result of the above moisture adsorption experiment is shown in FIG. 2. A horizontal axis in FIG. 2 indicates an amount of time that each sample is left in the atmosphere having the temperature of 95 to 100 degrees Celsius and the relative humidity of 95 to 100%, and a vertical axis indicates a water content ratio which indicates a water content of the water adsorbed by each sample per unit weight in weight percentage (wt %). The water content ratio is obtained by dividing the water content by a weight of the water filling the entire pores (a weight corresponding to the volume of the entire pores).

As will be noted from FIG. 2, saturated water content ratios of the samples A, B, C, and D are approximately 58 wt %, 27 wt %, 14 wt %, and 8 wt %, respectively, and are higher in proportion to the pore diameters. In other words, volume ratios of the pores which do not adsorb the water, that is to say, which are not filled with the water (abbreviated as the porosity hereinafter) in the samples A, B, C, and D are approximately 42%, 63%, 86%, and 92%, respectively, and are higher as the pore diameters are smaller.

Moreover, amounts of time to reach the saturated water content ratios of the samples A, B, C, and D are approximately 480 minutes, 120 minutes, 90 minutes, and 60 minutes, respectively, and are shorter as the pore diameters are smaller.

Thus, the activated carbon fiber having the small pores is preferable to the activated carbon fiber having the large pores by reason that a variation range of the porosity with the moisture change is smaller and moreover, the amount of time to reach the saturated water content is smaller, so that an acoustic characteristics is stable.

Here, when calculated from the above porosities, the specific surface areas of the respective samples A, B, C, and D which reach respective saturated water contents are 630 m$^2$/g, 630 m$^2$/g, 688 m$^2$/g, and 644 m$^2$/g, respectively. Thus, it is deemed that the respective samples which reach the saturated water contents have the comparable specific surface areas after the moisture adsorption experiment regardless of the specific surface areas before the moisture adsorption experiment. The specific surface areas of the respective samples after the moisture adsorption experiment are calculated by an equation described below.

The specific surface area of the sample after the moisture adsorption experiment=(the specific surface area before the moisture adsorption experiment)×(the porosity after the moisture adsorption experiment)

Generally, as the specific surface area of the activated carbon fiber is larger, the activation time is longer, and moreover, a fabrication yield is lowered, so that a manufacturing cost increases. Thus, in the present invention, the activated carbon fiber having the small specific surface area is preferable to the activated carbon fiber having the large specific surface area in view of the water adsorption, since it has a high cost-effectiveness.

(Acoustic Property)

Next, the respective samples A, B, C, and D before the moisture adsorption experiment and after the moisture adsorption experiment are put in a measuring closed box loudspeaker device, and then an acoustic impedance is measured and the lowest resonance frequency (abbreviated as the $f_0$ hereinafter) is examined. An experimental result is shown in FIG. 3. The $f_0$ of the closed box loudspeaker device in which no sample is put is 250 Hz.

As shown in FIG. 3, variation ranges of the $f_0$ of the samples A, B, C, and D before the moisture adsorption experiment and after the moisture adsorption experiment are approximately 6 Hz, 3 Hz, 0 Hz, and 0 Hz, respectively. Thus, the $f_0$ of the samples C and D do not vary with the moisture change, so that above experimental result suggests that the loudspeaker device which has the high moisture resistance and further has a stable audio performance of low-frequency range sounds can be achieved.

Moreover, the $f_0$ of the samples A, B, and D after the moisture adsorption experiment are 238 to 240 Hz, which are almost the same values, regardless of the $f_0$ before the moisture adsorption experiment. A reason of it is considered to be that in the samples A, B, and D after the moisture adsorption experiment, the specific surface areas of the pores which have the adsorption sites to adsorb the gas have almost the same value as described above.

Moreover, when the $f_0$ of the samples C and D are compared, the $f_0$ of the sample C is 5 Hz higher than that of the sample D. This difference is considered to be caused mainly by the difference in the form of the activated carbon fiber, that is to say, the difference between the felt activated carbon fiber (the sample C) and the cottony activated carbon fiber (the sample D).

A preferred pore structure of the activated carbon fiber of the present invention is described below based on the result of the moisture adsorption experiment described above.

As will be noted from the illustration of FIGS. 2 and 3, it is preferable that the activated carbon fiber of the present invention has the pores having diameter of 2.0 nm or less and the volume of the pores having the diameter of 2.0 nm or less occupies 60% or more of the volume of the entire pores. Such an activated carbon fiber has advantages that it has the high gas adsorption efficiency since it has the large volume ratio of the pores which are effective for adsorbing the gas and moreover, the manufacturing cost can be reduced.

It is more preferable that the activated carbon fiber of the present invention has the pores having diameter of 1.8 nm or less and the volume of the pores having the diameter of 1.8 nm or less occupies 80% or more of the volume of the entire pores. Such an activated carbon fiber has advantages that the gas adsorption performance is not deteriorated by the change in moisture and remains stable.

(Preferred Embodiment 2)

FIG. 4 is a schematic sectional view showing a configuration example of a bass reflex loudspeaker device according to the present invention.

A bass reflex loudspeaker device 40 has a configuration similar to the closed box loudspeaker device 10 shown in FIG. 1 except that an acoustic port 41 is attached to a portion of the box 12.

As illustrated in FIG. 1, the activated carbon fiber 14 does not need to be sealed in the film as is conventionally done since it has the high moisture resistance. Thus, the bass reflex loudspeaker device 40 can widen the audio range of the low-frequency range sounds, by a synergetic effect of the acoustic port 41 and the activated carbon fiber 14, more effectively than the closed box loudspeaker device 10 illustrated in FIG. 1.

(Specific Embodiment 1)

The following configuration members are provided and the closed box loudspeaker device shown in FIG. 1 is experimentally produced.

Activated carbon fiber:

Coal pitch activated carbon fiber called "UNITIKA AD'ALL", which is the same as the sample D illustrated in FIG. 2, manufactured by UNITIKA LTD. . . . 30 g Loudspeaker unit:

Full-range loudspeaker unit called "FE87E", which has a cone-shaped diaphragm, manufactured by FOSTEX COMPANY Box:

Wooden box (Volume: approximately 0.66 liter)

A coal pitch activated carbon fiber, which is left in the atmosphere having the temperature of 20 degrees Celsius and the relative humidity of 30% for 24 hours, is used in the closed box loudspeaker device.

A humidity test is performed under conditions of leaving the closed box loudspeaker device described above in an atmosphere having a temperature of 55 degrees Celsius and a relative humidity of 95% for 8 hours. After the humidity test, the acoustic impedance of the closed box loudspeaker device is measured and the $f_0$ is measured. Before the humidity test, the $f_0$ of the closed box loudspeaker device is 220 Hz, and the $f_0$ of the closed box loudspeaker device in which no activated carbon fiber is put is 250 Hz.

As a result, the $f_0$ of the closed box loudspeaker device after the humidity test is 220 Hz, which is the same as that of the closed box loudspeaker device before the humidity test. Moreover, the water content ratio of the activated carbon fiber after the humidity test is 8 wt %.

A reason for the adsorption of the water by the activated carbon fiber is considered to be that the water vapor enters from the cone-shaped diaphragm, the edge, or the like.

From the result of the above humidity test, it is confirmed that the loudspeaker device according to the present invention has the high moisture resistance and further has the effect of widening the audio range of the low-frequency range sounds.

Industrial Applicability

The loudspeaker device according to the present invention is useful in an acoustic equipment such as a television device, a home theater, a car stereo system, a loudspeaker device for a personal computer, headphones, or the like.

DESCRIPTION OF THE NUMERALS

10 closed box loudspeaker device
11 opening
12 box
13 loudspeaker unit
14 activated carbon fiber
15 frame
16 edge
17 diaphragm
18 voice coil
19 magnet
40 bass reflex loudspeaker device
41 acoustic port

The invention claimed is:

1. A loudspeaker device, comprising:
   a box which has an opening;
   a loudspeaker unit which is attached to the opening in an inner side of the box; and
   activated carbon fiber in the box to adsorb gas in atmosphere in response to a pressure change of acoustic waves which are radiated from a back surface of the loudspeaker unit, wherein
   the activated carbon fiber has pores which adsorb the gas regardless of a degree of humidity in the atmosphere, the pores have surface pores which are exposed on a surface of the activated carbon fiber and have a diameter of 2.0 nm or less, and a volume of the surface pores occupies 60% or more of a volume of the entire pores, and the volume of the entire pores is 0.5 ml/g or less.

2. The loudspeaker device according to claim 1, wherein the surface pores exposed on the surface of the activated carbon fiber have a diameter of 1.8 nm or less and a volume of the surface pores having the diameter of 1.8 nm or less occupies 80% or more of a volume of the entire pores, and the volume of the entire pores is 0.3 ml/g or less.

3. The loudspeaker device according to claim 1, wherein a material of the activated carbon fiber is coal pitch or phenol resin.

4. The loudspeaker device according to claim 2, wherein a material of the activated carbon fiber is coal pitch or phenol resin.

5. The loudspeaker device according to claim 3, wherein the activated carbon fiber is thermally processed at a temperature of 800 to 1100 degrees Celsius.

6. The loudspeaker device according to claim 1, wherein the loudspeaker device is a closed box loudspeaker device.

7. The loudspeaker device according to claim 2, wherein the loudspeaker device is a closed box loudspeaker device.

8. The loudspeaker device according to claim 3, wherein the loudspeaker device is a closed box loudspeaker device.

9. The loudspeaker device according to claim 4, wherein the loudspeaker device is a closed box loudspeaker device.

10. The loudspeaker device according to claim 5, wherein the loudspeaker device is a closed box loudspeaker device.

11. The loudspeaker device according to claim 1, wherein the loudspeaker device is a bass reflex loudspeaker device having an acoustic port.

12. The loudspeaker device according to claim 2, wherein the loudspeaker device is a bass reflex loudspeaker device having an acoustic port.

13. The loudspeaker device according to claim 3, wherein the loudspeaker device is a bass reflex loudspeaker device having an acoustic port.

14. The loudspeaker device according to claim 4, wherein the loudspeaker device is a bass reflex loudspeaker device having an acoustic port.

15. The loudspeaker device according to claim 5, wherein the loudspeaker device is a bass reflex loudspeaker device having an acoustic port.

16. Activated carbon fiber for a loudspeaker device which adsorbs gas in atmosphere in response to a pressure change of acoustic waves, which are radiated from a back surface of a loudspeaker unit which is attached to an opening in an inner side of a box, wherein the activated carbon fiber has pores which adsorb the gas regardless of a degree of humidity in the atmosphere, the pores have surface pores which are exposed on a surface of the activated carbon fiber and have a diameter of 2.0 nm or less, and a volume of the surface pores occupies 60% or more of a volume of the entire pores, and the volume of the entire pores is 0.5 ml/g or less.

17. The activated carbon fiber for the loudspeaker device according to claim 16, wherein the surface pores exposed on the surface of the activated carbon fiber have a diameter of 1.8 nm or less and a volume of the surface pores occupies 80% or more of a volume of the entire pores, and the volume of the entire pores is 0.3 ml/g or less.

* * * * *